Patented July 9, 1946

2,403,570

UNITED STATES PATENT OFFICE 2,403,570

KETONES SUBSTITUTED BY MODIFIED PROPIONIC ACID RADICLES AND A PROCESS OF PRODUCING SAME

Georg Wiest, Ludwigshafen-on-the-Rhine, and Heinrich Glaser, Bonn, Germany; vested in the Alien Property Custodian No Drawing. Application February 6, 1941, Serial No. 377,664. In Germany February 12, 1940

10 Claims. (Cl. 260—464)

1

The present invention relates to ketones substituted by modified propionic acid radicles and a process of producing same.

We have found that ketones substituted in α-position to the keto group by two radicles of a nitrogenous functional derivative of propionic acid, may be prepared very easily and with good yields by causing one molecular proportion of a ketone containing in α-position to the keto group at least one $CH_2$-group to act on more than one molecular proportion of a nitrogenous functional derivative of acrylic acid, e. g. acrylic acid nitrile or acrylic acid amides, in the presence of an alkaline catalyst.

Suitable ketones of the said kind are for example purely aliphatic or cycloaliphatic ketones, such as methyl ethyl ketone, diethyl ketone, methyl iso-butyl ketone, cyclo-hexanone, methyl cyclohexanone, cyclopentanone, acetyl acetone, acetonyl acetone, and ketones containing aliphatic as well as aromatic radicles, such as ethyl phenyl ketone, phenyl benzyl ketone or benzoyl acetone.

The reaction consists in the addition of at least two molecular proportions of the acrylic acid derivative to one molecular proportion of the ketone and proceeds in accordance with the following equation showing the reaction between acrylic acid nitrile and methyl ethyl ketone:

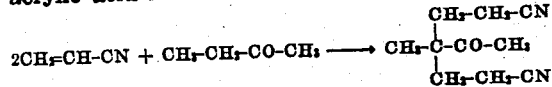

α-(Di-ω-cyanethyl)-ethyl methyl ketone

If the ketone used as starting material contains more than one $CH_2$-group in α-position to a keto group, there may be added two molecules of acrylic acid derivative for each of those $CH_2$-groups. Thus, cyclohexanone may add four molecules of acrylic acid nitrile according to the following equation:

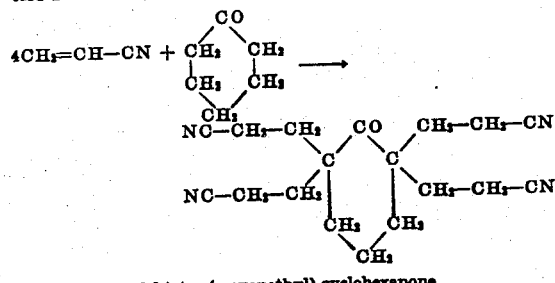

2,6-tetra-(ω-cyanethyl)-cyclohexanone

The reaction products constitute ketones which

2 are substituted in at least one α-position to the keto group by two radicles of a nitrogenous functional derivative of propionic acid. They correspond to the general formula

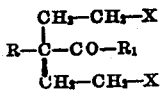

wherein R stands for an alkyl, aralkyl or aryl radicle, wherein $R_1$ stands for an alkyl, aralkyl or aryl radicle or for

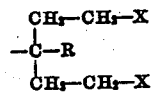

or wherein R and $R_1$ may be members of a saturated carboxylic ring, and wherein X stands for a modified carboxylic acid group containing nitrogen, e. g. the nitrile group or an amide group.

In addition to these addition products of two molecules of an acrylic acid derivative to one $CH_2$-group, there may be formed as by-products in some cases small amounts of compounds formed by the addition of one molecule of the acrylic acid derivative to one $CH_2$-group. Generally speaking, the bimolecular addition products are almost exclusively formed even if using only a slight excess of the acrylic acid derivative over the ketone. Under these conditions only part of the ketone will react, the remaining amount being left unchanged. It is, therefore, preferable to use at least two molecular proportions of the acrylic acid derivative for one moleular proportion of the ketone.

The monomolecular addition products may easily be converted into bimolecular addition products by bringing them into contact with the acrylic acid derivatives in the presence of alkaline catalysts. It is also possible to add these monomolecular addition products to the starting materials used in the practice of our invention.

The addition of the acrylic acid derivatives to ketones containing $CH_2$-groups proceeds so smoothly that the reaction may be started by simply adding one of the starting materials to the other starting material admixed with the catalyst. The reaction proceeds with the evolution of heat. Since the acrylic acid derivatives are liable to be polymerized at high temperatures, temperatures exceeding about 100° C., preferably those exceeding 70° C. should not be used. In order to avoid the polymerization of the acrylic acid derivatives, substances prohibiting the polymerization, e. g. copper or hydroquinone, may be present. If necessary, the reaction mixture has to be cooled during the reaction. When the vigor of the reaction has abated, it may be suitable to gently heat the reaction mixture in order to accelerate the reaction. The reaction may be carried out in the presence of inert solvents or diluents.

Various alkaline substances may serve as the catalyst. Thus, the alkali and alkaline earth metals themselves and their compounds having an alkaline reaction are suitable, for example their oxides, hydroxides or alcoholates. Basic nitrogen compounds may also be used, as for example pyridine. The amount of catalyst to be used may be very small; generally speaking few per cents or less than one per cent thereof, calculated on the amount of the ketone are sufficient. It is not necessary and does not offer any advantage to use an amount corresponding to more than 10 per cent of the acid derivative. When using alkali metals as the alkaline catalyst, the course of the reaction is even unfavorably affected by using large amounts, e. g. more than 50 per cent, of the catalyst.

The products obtainable according to our invention may be used for the production of keto dicarboxylic acids by saponifying the modified carboxylic acid group. The esters of these keto dicarboxylic acids are most suitable as plasticizers or solvents.

The following examples will further illustrate how our invention may be carried out in practice. The invention, however, is not restricted to these examples. The parts are by weight.

Example 1

210 parts of acrylic acid nitrile are allowed to flow slowly at 40° C. into a solution of 100 parts of cyclohexanone in 200 parts of benzene, to which 0.2 part of metallic sodium has been added, while stirring. The addition product is formed at once; it deposits in solid form in the course of the reaction. Finally there is obtained a thick pulp of crystals. The crystals are filtered off and washed with methanol. The yield amounts to 250 parts. After recrystallization from glacial acetic acid, the compound melts at 160° C. It contains four molecules of acrylic acid nitrile for one molecule of cyclohexanone and corresponds to the formula:

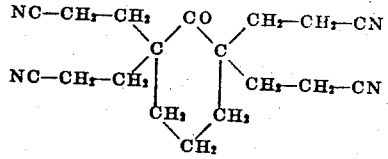

The same compound may be obtained when replacing the metallic sodium by 1 part of finely divided sodium hydroxide.

Example 2

106 parts of acrylic acid nitrile are allowed to act on a mixture of 72 parts of methyl ethyl ketone with 0.2 part of metallic sodium at 30–40° C. while stirring. The mixture is then allowed to stand for some hours. It is diluted with acetone, and carbon dioxide is introduced until it is no longer absorbed. The mixture is filtered off and the filtrate distilled. There are obtained 90 parts of a fraction boiling at 200–203° C. under 1.5 millimeters pressure which solidifies to form crystals melting at 60–62° C. The compound corresponds to the formula:

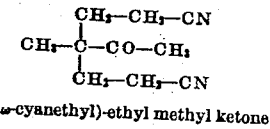

α-(Di-ω-cyanethyl)-ethyl methyl ketone

What we claim is:

1. α-Di-(ω-cyanethyl)-ethyl methyl ketone.
2. 2.6-tetra-(ω-cyanethyl)-cyclohexanone.
3. A process for the production of ketones substituted by ω-cyanoethyl radicals which consists in reacting in the presence of an alkaline catalyst at least two molecular proportions of acrylic acid nitrile with one molecular proportion of an aliphatic ketone having only saturated hydrocarbon substituents in addition to the carbonyl group and having at least one —CH$_2$— group alpha to the carbonyl group.
4. A process for the production of ketones substituted by ω-cyanoethyl radicals which consists in reacting in the presence of an alkaline catalyst two molecular proportions of acrylic acid nitrile with one molecular proportion of methyl ethyl ketone.
5. An aliphatic ketone having only saturated hydrocarbon substituents in addition to the carbonyl group and having in at least one position alpha to the carbonyl group two ω-cyanoethyl radicals.
6. A process for the production of ketones substituted by ω-cyanoethyl radicals which consists in reacting in the presence of an alkaline catalyst at least two molecular proportions of acrylic acid nitrile with one molecular proportion of a saturated monocycloaliphatic ketone having two —CH$_2$— groups in alpha positions to the carbonyl group.
7. A process for the production of ketones substituted by ω-cyanoethyl radicals which consists in reacting in the presence of an alkaline catalyst at least two molecular proportions of acrylic acid nitrile with one molecular proportion of cyclohexanone.
8. Saturated mono-cycloaliphatic ketones having in at least one position alpha to the carbonyl group two ω-cyanoethyl radicals.
9. A process for the production of ketones substituted by ω-cyanoethyl radicals which consists in reacting in the presence of an alkaline catalyst at least two molecular proportions of acrylic acid nitrile with one molecular proportion of a ketone selected from the class consisting of aliphatic and cycloaliphatic ketones having only saturated hydrocarbon substituents in addition to the carbonyl group and having at least one —CH$_2$— group alpha to the carbonyl group.
10. β-cyanoethylated ketones of the class comprising aliphatic and cycloaliphatic ketones, having two β-cyanoethyl groups attached to at least one carbon atom contiguous to the carbonyl group.

GEORG WIEST.
HEINRICH GLASER.